United States Patent [19]

Walker

[11] 4,445,800

[45] May 1, 1984

[54] WRIST PIN

[76] Inventor: Raymond L. Walker, P.O. Box 1342, San Clemente, Calif. 92672

[21] Appl. No.: 324,619

[22] Filed: Nov. 24, 1981

[51] Int. Cl.³ .............................................. F16B 21/00
[52] U.S. Cl. ...................................... 403/14; 403/154; 74/595
[58] Field of Search ............... 403/155, 154, 150, 151, 403/161, 162, 163, 13, 14; 74/595

[56] References Cited

U.S. PATENT DOCUMENTS

| | | | |
|---|---|---|---|
| 1,634,166 | 6/1927 | Willis et al. ............................ | 74/595 |
| 1,775,054 | 9/1930 | Seegers .................................... | 74/595 |
| 1,827,487 | 10/1931 | Reeves .................................... | 280/90 |
| 3,424,014 | 1/1969 | Harris .............................. | 403/161 X |

FOREIGN PATENT DOCUMENTS 549108  11/1942  United Kingdom .................. 74/595

Primary Examiner—Andrew V. Kundrat
Attorney, Agent, or Firm—Head, Johnson & Stevenson

[57] ABSTRACT

A wrist pin for securing a crank arm with a pittman arm to translate rotary motion into longitudinal motion and comprising a shank adapted for insertion transversely through a bore provided in the crank arm, a retaining plate secured to one end of the shank and engagable with one face of the crank arm for positively securing the shank in engagement with the crank arm, an enlarged head member at the opposite end of the shank for engaging the opposite face of the crank arm in order to limit the movement of the wrist pin in one direction, and a connecting member extending axially outwardly from the head member for engagement with the pittman arm.

4 Claims, 3 Drawing Figures

WRIST PIN

BACKGROUND OF THE INVENTION

1. Field of the Invention

This invention relates to improvements in connecting devices and more particularly, but not by way of limitation, to a wrist pin for the connecting rod and crank arm of a pumping unit, or the like.

2. Description of the Prior Art

The usual wrist pin in use today for connecting the crank shaft of a pumping unit, internal combustion engine, or the like, with the pittman or connecting rod connected with the usual reciprocating arm extends transversely through the crank member for connection with the connecting rod and is secured in place by a lock nut threadedly secured to the outer end of the wrist pin. These crank arms and connecting rods are usually subjected to a great amount of vibration during reciprocation of the associated arm and one problem with wrist pins is the loosening of the locking nut which frequently results in an inadvertent loss of the wrist pin. In addition, the present day wrist pins are normally disposed in a tapered bore, and wear of the wrist pin frequently enlarges the bore in the crank and causes a necessity of replacing the entire crank. Some attempts have been made to overcome this problem, such as shown by the Reeves U.S. Pat. No. 1,827,487, and the Willis et al U.S. Pat. No. 1,634,166. The Keen patent relates to a crank pin for locomotives and is of hollow construction, with the pin being secured in position by a plurality of studs or bolts. The Willis et al patent shows a wrist pin which includes an outer sleeve having an inner sleeve threadedly secured therein, with the crank being engaged between the head members of the two sleeves. These solutions to the problem have certain disadvantages, however, in that they are expensive in construction and installation.

SUMMARY OF THE INVENTION

The present invention relates to a wrist pin which has been particularly designed and constructed for overcoming the foregoing disadvantages. The novel wrist pin comprises a shank adapted to extend transversely through a straight walled bore in a crank arm for connection with the usual pittman or connecting rod in the normal manner and is provided with an enlarged head member at one end thereof having an annular shoulder adapted for abutment against one side or face of the crank in order to limit the movement of the pin in one direction. The outer end of the shank preferably terminates substantially flush with the opposite face of the crank and a locking plate member is secured against said opposite face of the crank and to the pin by means of a plurality of bolts which extend through the plate and into threaded engagement with the shank. It is also desirable to provide a plurality of indexing pins which extend from the plate or disc into complementary bores provided in the face of the crank arm in the proximity of the bore which receives the shank therethrough. This positive locking of the shank by means of the lock plate and a plurality of bolts substantially precludes any accidental loss of the wrist pin from the crank and pittman during operation of the pumping unit, or the like. The novel wrist pin is simple and efficient in operation and economical and durable in construction.

DETAILED DESCRIPTION OF THE PREFERRED EMBODIMENT

Figure 2:
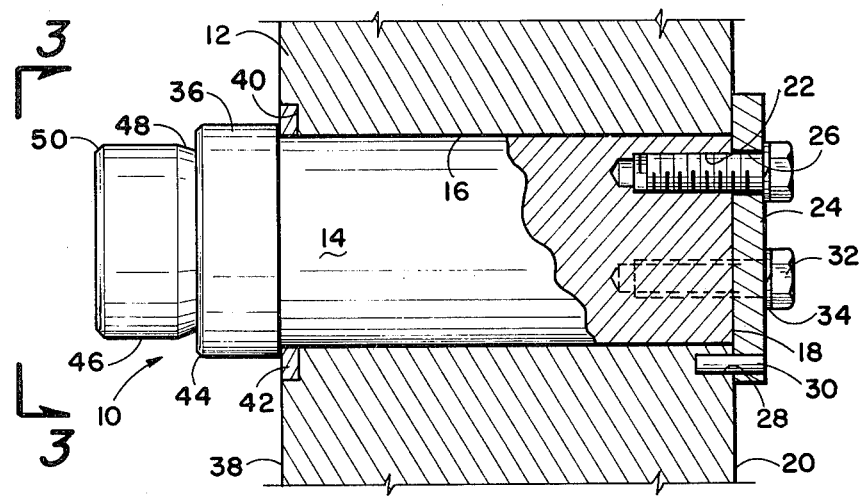
FIG. 2 is a view taken on line 2—2 of FIG. 1.
Figure 3:
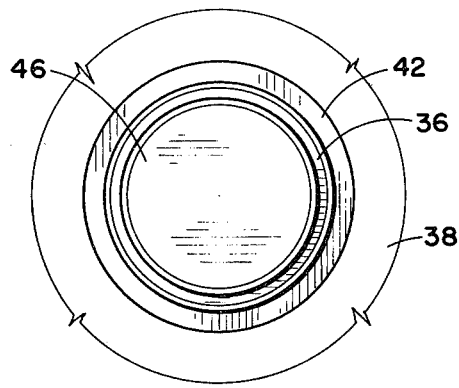
FIG. 3 is a view taken on line 3—3 of FIG. 2.
Figure 1:
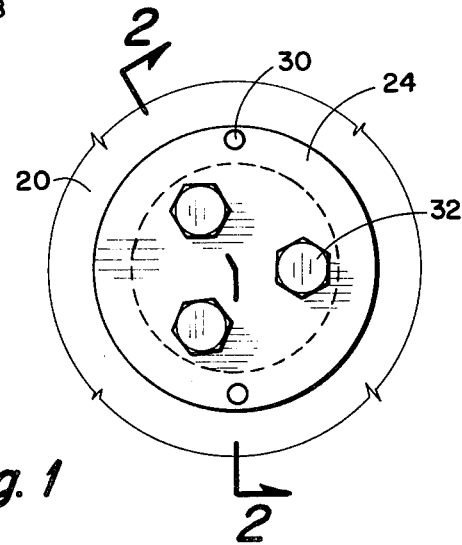
FIG. 1 is an end elevational view of a wrist pin embodying the invention and shown as installed in a crank arm.

Referring to the drawings in detail, reference character 10 generally indicates a wrist pin for pivotally securing a crank arm 12, or the like, to a pittman (not shown) as is well known. The wrist pin 10 comprises a shank member 14 having a diameter complimentary to the diameter of a bore 16 extending transversely through the crank 12 for receiving the wrist pin 10 therein. One end 18 of the shank 14 preferably terminates substantially flush or parallel with one face 20 of the crank arm 12 as will be particularly seen in FIG. 2. A plurality of circumferentially spaced longitudinally extending threaded bores 22 are provided in the end 18 of the shank 14 and a retaining plate 24 having a plurality of bores 26 provided therein for alignment with the bores 22 is disposed against the face 20 and adjacent the outer end 18 of the shank 14. The plate 24 is of a sufficiently large dimension as to completely encompass the end 18 and extends peripherally therearound against the face 20 of the crank 12. At least one indexing bore 28 is provided in the face 20 in the proximity of the bore 16 for receiving an indexing pin 30 which is secured to or carried by the plate 24 for facilitating positioning of the plate 24 in such a manner that the bores 26 are substantially aligned with the bores 22. The plate 24 is held securely in position against the face 20 and end 18 of the shank 14 by a plurality of suitable screws or bolts 32. Of course, it is desirable to interpose suitable lock washers 34 between the outer face of the plate 24 and each screw 32 as is well known.

The opposite end of the shank 14 is provided with an enlarged head member 36 disposed outboard of the opposite face 38 of the crank 12. An annular recess 40 is preferably provided around the bore 16 and open to the surface 38 of the crank 12 for receiving an annular washer or gasket 42 therein. The head member 36 bears against the washer 42 as is shown in FIG. 2. The outer end of the head member 36 is preferably beveled as shown at 44 and a connector member 46 extends axially outwardly therefrom and is preferably undercut at the connection with the head member as shown at 48 and beveled at the outer end thereof as shown at 50. The diameter of the connector member 46 is preferably less than the diameter of the head member 36 and the connector member 46 is adapted for engagement with the usual bearing member (not shown) provided in the usual pittman arm or connecting rod (not shown) which is to be secured or connected with the crank 12.

The wrist pin 10 may be installed on the crank arm 12 by inserting the shank 14 into the bore 16 and engaging the head 36 with the washer 42 whereby the end 18 of the shank 14 is positioned in substantially coplanar relationship with the face 20 of the crank 12. The plate 24 may be placed against the aligned surfaces 18 and 20, with the index pin 30 being inserted in the indexing bore 28. This positions the bores 26 in substantial axial alignment with the bores 22 whereby the bolts 32 may be threadedly secured to the bores 22 for securely locking the plate 24 to the shank 14. In this manner the wrist pin 10 is securely retained in position in the crank arm 12 in a manner substantially precluding any accidental loss of the wrist pin therefrom. Furthermore, in the event the pin 10 becomes worn, it is only necessary to remove and replace the pin without any reboring of the crank.

From the foregoing it will be apparent that the present invention provides a novel wrist pin of a simple and economical construction which may be positively locked to a crank arm, or the like, for essentially precluding any accidental loss of the wrist pin during vibration or other operating conditions to which the crank arm and wrist pin may be subjected. The novel pin is secured to the crank arm by means of a locking plate and bolt means to provide the security against loss of the wrist pin.

Whereas the present invention has been described in particular relation to the drawings attached hereto, it should be understood that other and further modifications apart from those shown or suggested herein may be made within the spirit and scope of this invention.

What is claimed is:

1. A wrist pin for a crank arm means having a transversely extending straight-walled bore provided therein, said wrist pin comprising an elongated straight-walled solid shank member adapted to be positioned within said bore, head means provided at one end of the shank member for engaging one face of the crank arm means for limiting the depth of insertion of the shank member in the bore, retaining plate means disposed against the opposite end of the shank member for engagement with the opposite face of the crank arm means, securing means extending through the retaining plate means and into the shank member for positively securing the shank member to the crank arm means for precluding accidental disengagement therebetween, and indexing means cooperating between the retaining plate means and crank arm means for proper orientation of the plate means with respect to the shank means and for anchoring the shank member against independent rotation thereof with respect to the crank arm.

2. A wrist pin as set forth in claim 1 wherein said head means includes connector means extending axially outwardly therefrom.

3. A wrist pin as set forth in claim 1 wherein said opposite end of the shank member is provided with a plurality of spaced longitudinally extending bores in at least one end thereof and extending longitudinally into but not through the shank member, and the retaining plate means is provided with a plurality of apertures adapted to be positioned in substantial alignment with the longitudinally extending bores for receiving bolt means therethrough to secure the retaining plate means to the shank member and adjacent the crank arm means.

4. A wrist pin as set forth in claim 1 wherein the indexing means comprises at least one index bore provided in said opposite face of the crank arm means, and pin means carried by the retaining plate means for insertion within the indexing bore.

* * * * *